(12) United States Patent
Mueller et al.

(10) Patent No.: US 10,178,350 B2
(45) Date of Patent: Jan. 8, 2019

(54) PROVIDING SHORTENED RECORDINGS OF ONLINE CONFERENCES

(71) Applicant: GetGo, Inc., Boston, MA (US)

(72) Inventors: Alexander Mueller, Dresden (DE);
Martin Unzner, Dresden (DE);
Mathias Buhr, Freiberg (DE); Paul Elsner, Dresden (DE); Steffen Schulze, Dresden (DE)

(73) Assignee: GetGo, Inc., Boston, MA (US)

( * ) Notice: Subject to any disclaimer, the term of this patent is extended or adjusted under 35 U.S.C. 154(b) by 2 days.

(21) Appl. No.: 14/840,608

(22) Filed: Aug. 31, 2015

(65) Prior Publication Data
US 2017/0064254 A1 Mar. 2, 2017

(51) Int. Cl.
| H04N 7/15 | (2006.01) |
| G11B 27/034 | (2006.01) |
| H04L 12/18 | (2006.01) |
| G11B 27/28 | (2006.01) |

(52) U.S. Cl.
CPC .......... *H04N 7/155* (2013.01); *G11B 27/034* (2013.01); *G11B 27/28* (2013.01); *H04L 12/1831* (2013.01)

(58) Field of Classification Search
CPC ....... H04N 7/155; G11B 27/034; G11B 27/04
USPC ...................................................... 386/285
See application file for complete search history.

(56) References Cited

U.S. PATENT DOCUMENTS

| 6,185,527 | B1 * | 2/2001 | Petkovic | G06F 17/30746 |
| | | | | 704/231 |
| 6,597,859 | B1 * | 7/2003 | Leinhart | G06F 17/30787 |
| | | | | 386/248 |
| 2003/0055634 | A1 * | 3/2003 | Hidaka | G10L 25/00 |
| | | | | 704/222 |
| 2008/0086303 | A1 | 4/2008 | Sengamedu | |
| 2008/0198264 | A1 * | 8/2008 | Balram | G06F 3/14 |
| | | | | 348/459 |
| 2008/0221876 | A1 * | 9/2008 | Holdrich | G10L 21/04 |
| | | | | 704/201 |
| 2012/0106925 | A1 * | 5/2012 | Dirik | H04N 5/147 |
| | | | | 386/240 |
| 2012/0296914 | A1 * | 11/2012 | Romanov | G11B 27/034 |
| | | | | 707/741 |
| 2013/0091205 | A1 * | 4/2013 | Kotler | H04L 65/4015 |
| | | | | 709/204 |

* cited by examiner

*Primary Examiner* — Thai Q Tran
*Assistant Examiner* — Nien Yang
(74) *Attorney, Agent, or Firm* — BainwoodHuang (57) ABSTRACT

A technique processes an initial recording of a meeting. The technique involves receiving the initial recording of the meeting, and performing a content classification operation that electronically classifies the initial recording of the meeting into a set of relevant conference portions and a set of irrelevant conference portions. The technique further involves, based on the initial recording of the meeting, providing a shortened recording of the meeting. The shortened recording includes the set of relevant conference portions and omits the set of irrelevant conference portions.

22 Claims, 5 Drawing Sheets

PROVIDING SHORTENED RECORDINGS OF ONLINE CONFERENCES

BACKGROUND

A typical web meeting involves sharing content among multiple meeting participants. In particular, the meeting participants are able to view visual content (e.g., slides of a slide show, pages of a document, etc.), as well as share audio content (e.g., ask questions and inject comments) to form a collaborative exchange even though the meeting participants may be scattered among remote geographical locations.

For such a web meeting, a conventional web meeting service may allow a meeting participant to create and save a recording of the web meeting. As a result, the meeting participant can replay the recording at a later time to review the visual and audio content of the web meeting.

SUMMARY

It should be understood that there are deficiencies to the above-described conventional web meeting service that allows a meeting participant to create and save a recording of a web meeting. Along these lines, the recording of the web meeting may contain wasteful sections in which there was no useful discussion (e.g., no voice, thinking moments, distractions of participants joining or leaving, breaks, etc.). Unfortunately, when the meeting participant replays the recording of the web meeting, the meeting participant must sit through these wasteful sections or perhaps attempt to play the recording faster in order to review the significant sections of the web meeting. Either of these situations is unenjoyable and may even deter the meeting participant from replaying the recording altogether.

In contrast to the above-described conventional web meeting service in which a meeting participant simply creates and saves a recording of a web meeting, improved techniques are directed to providing shortened recordings of meetings. In particular, an initial recording of an online conference or other type of recorded meeting is classified into relevant portions and irrelevant portions in an automated manner. Then, a shortened recording (or recording digest) is provided based on the initial recording where the shortened recording includes the relevant portions but omits the irrelevant portions. A user that watches the shortened recording saves time and enjoys an improved user experience as the user only consumes the relevant portions of the initial recording.

One embodiment is directed to a method of processing an initial recording of a meeting. The method includes receiving the initial recording of the meeting, and performing a content classification operation that electronically classifies the initial recording of the meeting into a set of relevant conference portions and a set of irrelevant conference portions. The method further includes, based on the initial recording of the meeting, providing a shortened recording of the meeting. The shortened recording includes the set of relevant conference portions and omits the set of irrelevant conference portions.

In some arrangements, performing the content classification operation includes inputting the initial recording of the meeting into a detection engine that assesses content relevancy, and obtaining, as output from the detection engine, a series of range identifiers that identifies the set of relevant conference portions and the set of irrelevant conference portions of the initial recording. Such range identifiers may take the form of timestamps, frame numbers, sequence numbers, etc. that identify times (or locations) in the initial recording of the meeting.

In some arrangements, providing the shortened recording of the meeting includes outputting, as the shortened recording, playable content based on (i) the initial recording of the meeting and (ii) the series of range identifiers. Here, the playable content (e.g., a playable multimedia file) skips over the set of irrelevant conference portions.

In some arrangements, receiving the initial recording of the meeting includes acquiring a multimedia file from an online meeting engine. In these arrangements, the multimedia file includes recorded audio content and recorded video content that are contributed by a set of participants of the meeting.

In some arrangements, performing the content classification operation further includes generating the series of range identifiers according to recorded audio content of the multimedia file. Along these lines the range identifiers may correlate to voice passages, the absence of voice, thinking noises, certain transcribed phrases, combinations thereof, and so on.

In some arrangements, performing the content classification operation further includes generating the series of range identifiers according to recorded video content of the multimedia file. Along these lines the range identifiers may correlate to screen content (e.g., slide changes, mouse movements, scrolling, etc.), participant motion (e.g., attendee movement, head or mouth movements, etc.), and so on.

In some arrangements, performing the content classification operation further includes generating the series of range identifiers according to metadata read from the multimedia file. Along these lines the range identifiers may correlate to audience polling events, chat messages, attendees joining or leaving the session, active speaker information (e.g., who is talking), changing presenters, configuration changes (e.g., people turning their webcams off), questions from attendees, and so on.

In some arrangements, performing the content classification operation further includes generating the series of range identifiers according to a combination of factors such as recorded audio content, recorded video content, and/or metadata read from the multimedia file. In some situations, the various factors are weighted/scored/etc. to smartly determine whether portions of the initial recording are relevant or irrelevant.

In some arrangements, outputting the playable content includes writing the playable content to a playable file that is shorter in playing duration than the multimedia file from the online meeting engine. Here, the playable file includes abridged audio content and abridged video content based on the recorded audio content and recorded video content of the multimedia file.

In some arrangements, the viewer concurrently has access to both the multimedia file and the playable file via a media player. Here, the viewer is able to selectively play or skip over each of the irrelevant conference portions in real time.

In some arrangements, receiving the initial recording of the meeting includes, during the meeting, acquiring streaming audio content and streaming video content recorded by an online meeting engine participating in the meeting. That is, the online meeting engine captures the audio and video content for immediate evaluation into relevant and irrelevant portions.

Another embodiment is directed to a computer program product having a non-transitory computer readable medium that stores a set of instructions to process an initial recording of a meeting. The set of instructions, when carried out by computerized circuitry, causes the computerized circuitry to perform a method of:

(A) receiving the initial recording of the meeting;
(B) performing a content classification operation that electronically classifies the initial recording of the meeting into a set of relevant conference portions and a set of irrelevant conference portions; and
(C) based on the initial recording of the meeting, providing a shortened recording of the meeting.

The shortened recording includes the set of relevant conference portions and omits the set of irrelevant conference portions.

Yet another embodiment is directed to an electronic apparatus that includes an interface, memory, and control circuitry coupled to the interface and the memory. The memory stores instructions that, when carried out by the control circuitry, cause the control circuitry to:

(A) receive the initial recording of the meeting,
(B) perform a content classification operation that electronically classifies the initial recording of the meeting into a set of relevant conference portions and a set of irrelevant conference portions, and
(C) based on the initial recording of the meeting, provide a shortened recording of the meeting.

The shortened recording is accessible via the interface. Additionally, the shortened recording includes the set of relevant conference portions and omits the set of irrelevant conference portions.

It should be understood that, in the cloud context, some electronic circuitry is formed by remote computer resources distributed over a network. Such a computerized environment is capable of providing certain advantages such as distribution of hosted services and resources (e.g., software as a service, platform as a service, infrastructure as a service, etc.), enhanced scalability, etc.

Other embodiments are directed to electronic systems and apparatus, processing circuits, computer program products, and so on. Some embodiments are directed to various methods, electronic components and circuitry that are involved in providing shortened recordings of meetings.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to providing a shortened recording (or recording digest) of an online conference (or other type of meeting). In particular, an initial recording of an online conference is classified into relevant portions and irrelevant portions in an automated manner. Suitable classification criteria include recorded audio content (e.g., voice presence, voice absence, thinking noises, certain phrases, etc.), recorded video content (e.g., slide changes, mouse movements, participant movement, etc.), metadata (e.g., polling events, chat messages, attendees joining/leaving, identification of who is talking, presenter changes, configuration changes, questions from attendees, etc.), combinations thereof, and so on. Then, a shortened recording is provided based on the initial recording where the shortened recording includes the relevant portions but omits the irrelevant portions. A user that watches the shortened recording saves time and effort as the user only consumes the relevant portions of the initial recording.

The individual features of the particular embodiments, examples, and implementations disclosed herein can be combined in any desired manner that makes technological sense. Moreover, such features are hereby combined in this manner to form all possible combinations, permutations and variants except to the extent that such combinations, permutations and/or variants have been explicitly excluded or are impractical. Support for such combinations, permutations and variants is considered to exist in this document.

Figure 1:
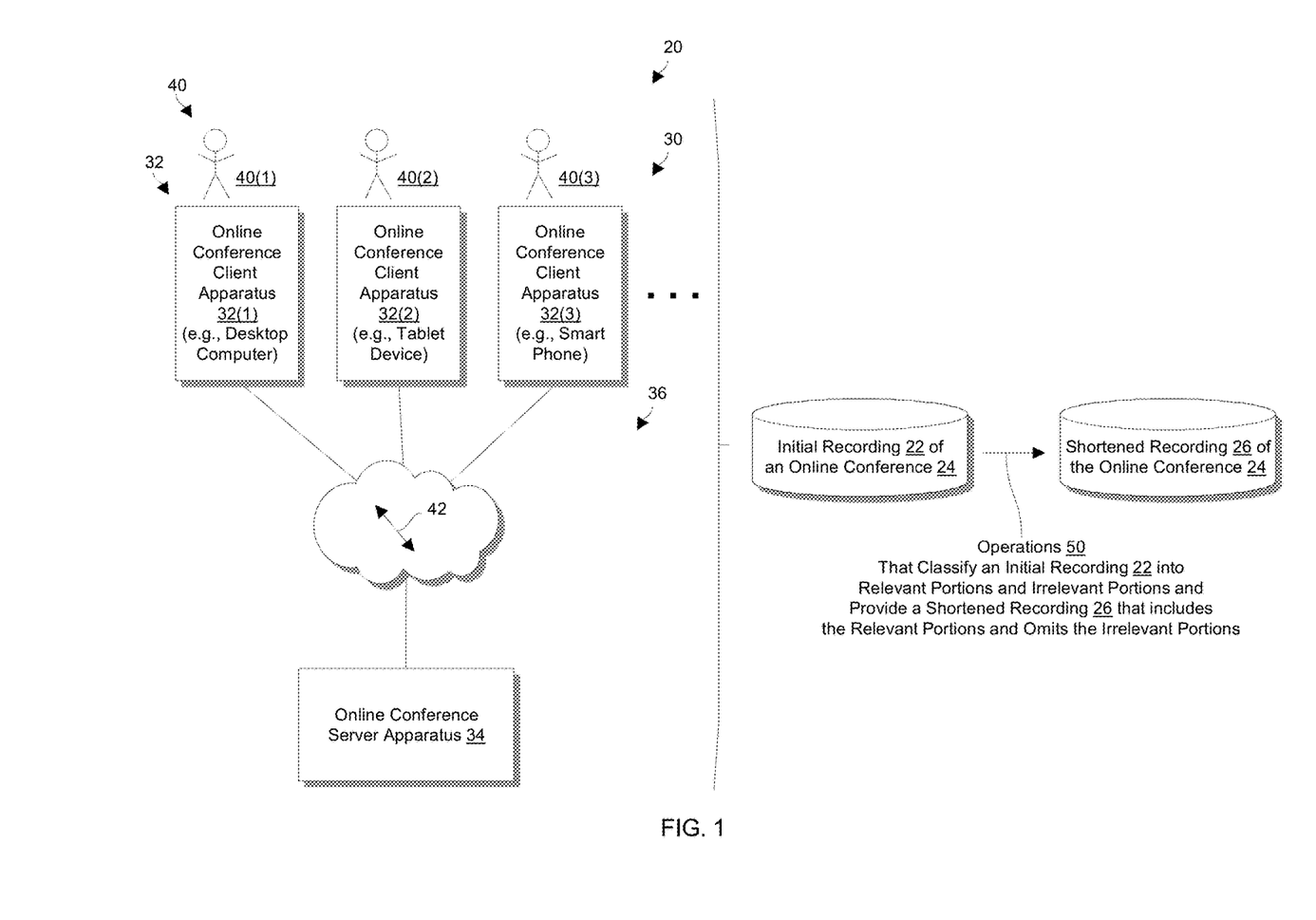
FIG. 1 is a block diagram of a computerized online conference (or similar meeting) setting that provides an initial recording of an online conference (or meeting) and creates a shortened recording from the initial recording.

FIG. 1 shows a computerized online conference setting (or similar type of meeting environment) 20 that provides an initial recording 22 of an online conference (or meeting) 24 and creates a shortened recording 26 from the initial recording 22. The computerized online conference setting 20 includes online conference equipment 30, namely, online conference client apparatus 32(1), 32(2), 32(3), . . . (collectively, online conference client apparatus 32), an online conference server apparatus 34, and communications medium 36.

Each client apparatus 32 is constructed and arranged to operate as an online conference agent by joining and participating in online conferences 24 (e.g., online meetings, online webinars, online conferences, etc.) and perhaps other online collaborative events (e.g., file sharing, document synchronization, shared access to other enterprise resources, etc.) on behalf of a human users 40. Along these lines, user 40(1) participates in online conferences 24 via client apparatus 32(1), user 40(2) participates in online conferences 24 via client apparatus 32(2), user 40(3) participates in online conferences 24 via client apparatus 32(3), etc. Suitable hardware for the client apparatus 32 includes a general purpose computer, a desktop workstation, a laptop computer, a tablet, a smartphone, and so on.

The online conference server 34 is constructed and arranged to reliably and robustly manage online conference events involving the client apparatus 32. In some arrangements, the online conference server 34 mainly manages user registration, user profiles, user verification, etc. and the various devices 32 collaborate via point-to-point communications. In other arrangements, the online conference server 34 includes specialized circuitry (e.g., a video engine, an audio engine, etc.) to further operate as an online conference/meeting engine to perform centralized content processing operations (e.g., distribution and adjustment of video content, mixing and distribution of audio content, etc.).

In some arrangements, the online conference server 34 is formed by multiple computers organized in a cluster. In other arrangements, the online conference server 34 is formed by a server farm. In yet other arrangements, the online conference server 34 is formed by distributed circuitry, i.e., the online conference server 34 is located in the "cloud".

The communications medium 36 is constructed and arranged to connect the various components of the computerized online conference setting 20 together to enable these components to exchange electronic signals 42 (e.g., see the double arrow 42). At least a portion of the communications medium 36 is illustrated as a cloud to indicate that the communications medium 36 is capable of having a variety of different topologies including backbone, hub-and-spoke, loop, irregular, combinations thereof, and so on. Along these lines, the communications medium 36 may include copper-based data communications devices and cabling, fiber optic devices and cabling, wireless devices, combinations thereof, etc. Furthermore, the communications medium 36 is capable of supporting LAN-based communications, cellular communications, plain old telephone service (POTS) communications, combinations thereof, and so on.

During operation, the computerized online conference setting 20 provides an initial recording 22 of an online conference 24. The initial recording 22 contains recorded audio content, recorded video content and metadata that was captured during the online conference 24. In some arrangements, the initial recording 22 is captured and stored locally by a particular client apparatus 32. In other arrangements, the initial recording 22 is captured and stored centrally by the online conference server apparatus 34.

As soon as an initial recording 22 of the online conference 24 is made, circuitry of the computerized online conference setting 20 is able to process the initial recording 22 in an automated electronic manner to generate a shortened recording 26 that contains playable content of the online conference 24. In particular, the circuitry performs operations 50 that classify the initial recording 22 into relevant portions and irrelevant portions, and provide the shortened recording 26 that includes the relevant portions but omits the irrelevant portions. As a result, a user 40 may watch the shortened recording 26 to save time and enjoy an improved user experience since the user 40 only consumes the relevant portions of the initial recording 22.

In some arrangements, the circuitry that performs the operations 50 resides within each client apparatus 32. In other arrangements, the circuitry that performs the operations 50 resides within the online conference server apparatus 34. In yet other arrangements, the circuitry that performs the operations 50 resides within both the client apparatus 32 and the server apparatus 34. Further details will now be provided with reference to FIG. 2.

Figure 2:
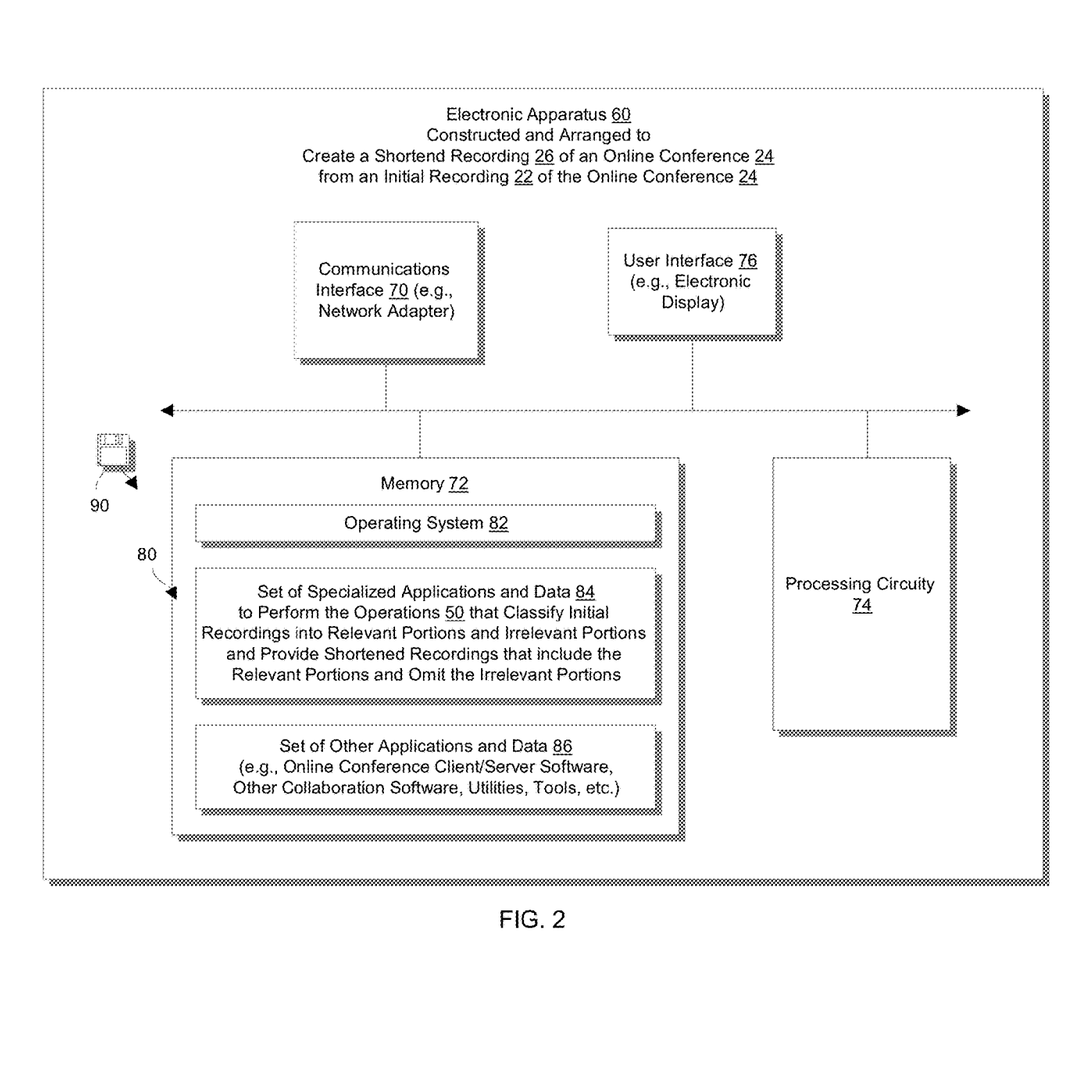
FIG. 2 is a block diagram of an electronic apparatus of the computerized online conference setting of FIG. 1 that creates the shortened recording.

FIG. 2 shows an electronic apparatus 60 of the computerized online conference setting 20 that creates the shortened recording 26 (also see FIG. 1). The electronic apparatus 60 includes a communications interface 70, memory 72, processing circuitry 74, and a user interface 76.

The communications interface 70 (e.g., a transceiver or network adapter) is constructed and arranged to connect the electronic equipment 60 to the communications medium 36 (FIG. 1). Accordingly, the communications interface 70 enables the electronic equipment 60 to communicate with the other components of the computerized online conference setting 20. Such communications may be line-based or wireless (i.e., IP-based, cellular, combinations thereof, and so on).

The memory 72 is intended to represent both volatile storage (e.g., DRAM, SRAM, etc.) and non-volatile storage (e.g., flash memory, magnetic disk drives, etc.). The memory 72 stores a variety of software constructs 80 including an operating system 82, a set of specialized applications and data 84 to perform the operations 50, and a set of other applications and data 86.

The processing circuitry 74 is constructed and arranged to operate in accordance with the various software constructs 80 stored in the memory 72. In particular, the processing circuitry 74, when executing the operating system 82, manages various resources of the electronic equipment 60 (e.g., memory allocation, processor cycles, hardware compatibility, etc.).

Additionally, the processing circuitry 74 operating in accordance with the set of specialized applications and data 84 forms specialized control circuitry (e.g., a detection engine) to classify initial recordings 22 of online conferences 24 into relevant portions and irrelevant portions and provide shortened recordings that include the relevant portions while omitting the irrelevant (or non-relevant) portions. As will be discussed in further detail shortly, the specialized control circuitry is able to distinguish the relevant portions from the irrelevant portions based on evaluations of recorded audio content, recorded video content, and/or metadata of the initial recording 22.

Furthermore, the processing circuitry 74 operating in accordance with the set of other applications and data 86 forms other specialized circuitry to perform other useful operations. It should be understood that the electronic apparatus 60 may be part of the online conference equipment 30 in the computerized online conference setting 20 of FIG. 1 or a separate device (e.g., dedicated or standalone equipment).

When the electronic apparatus 60 is part of the online conference equipment 30, the electronic apparatus 60 may further operate as a client apparatus 32 (FIG. 1). In this situation, the set of other applications and data 86 represents additional client-based software such as an online conference client application (e.g., to schedule online conferences, to present/participate in online conferences, etc.), other online client collaboration software (e.g., a browser, a slideshow application, a word processing application, etc.), other user-level applications (e.g., utilities, tools, etc.), and so on that enable a user 40 perform useful work.

Also when the electronic apparatus 60 is part of the online conference equipment 30, the electronic apparatus 60 may further operate as the online conference server apparatus 34 (FIG. 1). In this situation, the set of other applications and data 86 represents additional server-based software such as online meeting engine code that enables the server apparatus 34 to operate as a central online conference engine during online conferences. Such code may include instructions for combining real time audio feeds during online conferences, other instructions for processing real time video feeds during online conferences, and so on.

It should be understood that the above-mentioned processing circuitry 74 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 90 is capable of delivering all or portions of the software to the electronic apparatus 60. The computer program product 90 has a non-transitory and non-volatile computer readable medium that stores a set of instructions to control one or more operations of the electronic apparatus 60. Examples of suitable computer readable storage media include tangible articles of manufacture and apparatus that store instructions in a non-volatile manner such as CD-ROM, flash memory, disk memory, tape memory, and the like. Further details will now be provided with reference to FIG. 3.

Figure 3:
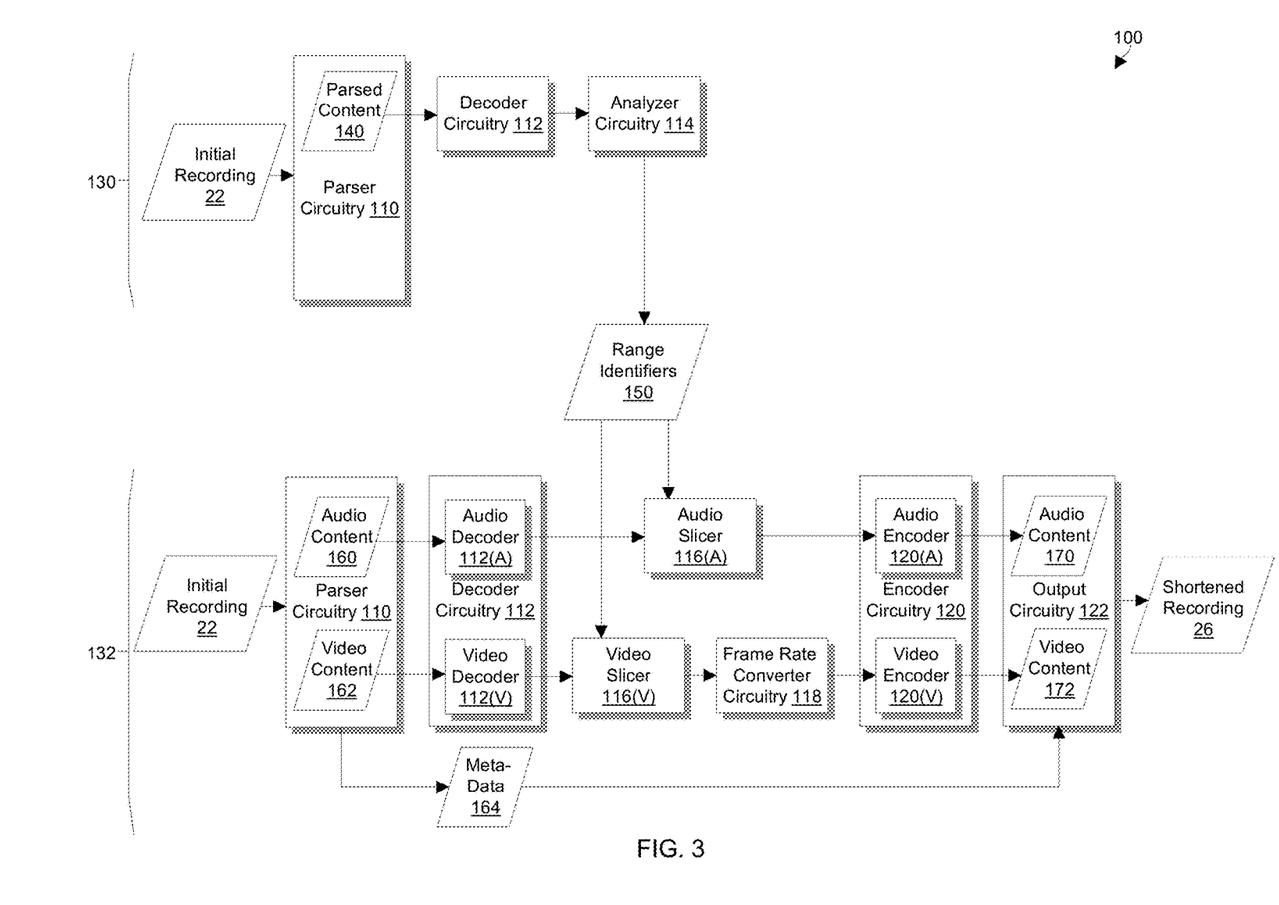
FIG. 3 is a block diagram illustrating particular circuitry involved in creating the shortened recording.

FIG. 3 shows details of particular circuitry 100 of the electronic apparatus 60 that is involved in creating a shortened recording (or digest) 26 of an online conference 24 from an initial recording 22 of the online conference 24. The particular circuitry 100 includes parser circuitry 110, decoder circuitry 112 having an audio decoder 112(A) and a video decoder 112(V), analyzer circuitry 114, an audio slicer 116(A), a video slicer 116(V), a frame rate converter 118, encoder circuitry 120 having an audio encoder 120(A) and a video encoder 120(V), and output circuitry 122.

In some arrangements, the above-listed circuitry is formed by specialized hardware. In other arrangements, the above-listed circuitry is formed by a set of microprocessors executing specialized code (e.g., see the set of specialized applications and data 84 in the memory 72 in FIG. 2) to form specialized circuitry. In yet other arrangements, the above-listed circuitry is formed by a combination of specialized hardware and a set of microprocessors running specialized code.

As shown in FIG. 3, the circuitry 100 is configured to process the initial recording in multiple passes 130, 132 in an automated manner. In particular, the circuitry classifies the initial recording 22 of the online conference 24 into relevant portions and irrelevant portions during a first pass 130. Such classification is based on one or more classification criteria. Suitable classification criteria include recorded audio content, recorded video content, metadata, and combinations thereof, among others. The circuitry then processes the initial recording 22 to create the shortened recording 26 that only includes the relevant portions during the second pass 132. In some arrangements, the circuitry prompts the user between the passes 130, 132, i.e., analyzing and skipping are separate phases so that the user is able to inspect the cuts before possibly losing relevant content. Further details will now be provided regarding each pass 130, 132.

During the first pass 130, the parser circuitry 110 parses data (e.g., recorded video content, recorded audio content, metadata such as subtitles, etc.) from the initial recording 22 for use in classification. In some arrangements, the initial recording 22 may have been obtained a significant amount of time earlier (e.g., earlier in the day, last week, from an archive, etc.) for subsequent post-processing. In other arrangements, the initial recording is obtained relatively recently (e.g., immediately following an online conference, streaming from an online conference agent or server immediately after the online conference is recorded, etc.).

For example, suppose that the initial recording 22 is an MP4 file and that the recorded audio content is used to classify the initial recording 22 into relevant and irrelevant portions. In this situation, the data in the file is in MPEG-4 format. The parser circuitry 110 extracts the recorded audio content from the file, and provides the extracted audio content as parsed content 150 to the decoder circuitry 112. It should be understood that other formats are suitable for use as well such as MPEG-2, MPEG-1, 3GP, Motion JPEG 2000, QuickTime File Format, and similar digital multimedia formats.

The decoder circuitry 112 then decodes the parsed content 150 for further processing by the analyzer circuitry 114. In the audio content example, the decoder circuitry 112 converts the extracted audio content from the parser circuitry 110 into digital form.

Next, the analyzer circuitry 114 classifies (or evaluates) that content, which is now in digital form, into relevant and irrelevant portions. Here, the analyzer circuitry 114 performs a content classification operation to classify sections of the content into relevant and irrelevant portions, i.e., the analyzer circuitry 114 operates as a detection engine that assesses content relevancy. In the audio content example, suitable criteria for classifying the recorded audio content include whether voice is present, whether voice is absent, whether the recorded audio content currently includes thinking noises, whether the speaker says certain phrases, combinations thereof, and so on. Accordingly, the analyzer circuitry 114 may perform speech to text recognition, filtering, sound detection, other audio processing operation, and so on.

The output of the analyzer circuitry 114 includes range identifiers 150 that identify the relevant portions and irrelevant portions of the initial recording 22. That is, the range identifiers 150 correlate to the particular classification criteria utilized by the analyzer circuitry 114 such as when voice is present, when voice is absent, the occurrence of thinking noises, etc. Accordingly, such range identifiers indicate when the relevant portions and the irrelevant portions begin and end.

In some arrangements, the range identifiers 150 are timestamps such as time (e.g., HH:MM:SS) from the start of the initial recording. Other time-based or recording-based formats are suitable for use as well such as a list of sequence numbers, frame numbers, and so on. Also, other types of information are suitable for use as the range identifiers 150 such as section breaks, markers, metadata, combinations of different identifiers, and so on. The circuitry 100 then saves or buffers the ranger identifiers 150 for use in the second pass 132 (e.g., see the set of specialized applications and data 84 in the memory 72 in FIG. 2).

During the second pass 132, the parser circuitry 110 parses all of the data of the initial recording 22 (e.g., video content, audio content, metadata such as subtitles, etc.) for use in generating the shortened recording 26. In particular, the parser circuitry 110 extracts the recorded audio content 160 from the initial recording 22, and provides the extracted audio content 160 to the audio decoder 112(A) of the decoder circuitry 112. Similarly, the parser circuitry 110 extracts the recorded video content 162 from the initial recording 22, and provides the extracted video content 162 to the video decoder 112(V) of the decoder circuitry 112. Furthermore, any metadata 164 (e.g., subtitles, privileges, file properties, etc.) from the initial recording 22 is stored temporarily for inclusion into the shortened recording 26 if appropriate.

The audio decoder 112(A) then converts the extracted audio content 160 from the parser circuitry 110 into digital form. Likewise, the audio decoder 112(B) converts the extracted video content 162 from the parser circuitry 110 into digital form. In some arrangements, such audio and video processing occurs in parallel.

Next, the audio slicer 116(A) edits the audio stream (i.e., extracted and digitized audio content 160) to form a shortened (or abridged) audio stream. Similarly, the video slicer 116(V) edits the video stream (i.e., extracted and digitized video content 162) to form a shortened (or abridged) video stream. Such processing involves saving (or keeping) content based on the range identifiers 150 provided by the first pass 130. Again, in some arrangements, such audio and video processing occurs in parallel.

In connection with the video stream, the frame rate converter circuitry 118 performs frame rate conversion operations on the shortened video stream. In some arrangements, the frame rate converter circuitry 118 matches the frame rate to that of the initial recording 22. In other arrangements, the frame rate converter circuitry 118 modifies the frame rate (e.g., faster, slower, etc.) to improve the user experience, based on user preferences, etc.

Subsequently, the audio encoder 120(A) of the encoder circuitry 120 encodes the shortened audio stream into abridged audio content 170. Similarly, the video encoder 120(V) of the encoder circuitry 120 encodes the shortened video stream into abridged video content 172. In some arrangements, such audio and video encoding occurs in parallel.

Then, the output circuitry 122 outputs the shortened recording 26 containing playable content, i.e., the abridged audio content 170, the abridged video content 172, and the metadata 164. The shortened recording 26 is shorter in duration than the initial recording 22 when played on a media player. In some arrangements, the shortened recording 26 is stored for future user access (e.g., as an MP4 file). In other arrangements, the shortened recording 26 is rendered in real time to a user.

It should be understood that the classification operation performed by the analyzer circuitry 114 during the first pass 130 was described above as being based on the audio content 160 of the initial recording 22. In other arrangements, the classification operation performed by the analyzer circuitry 114 is based on other criteria such as recorded video content (e.g., slide changes, mouse movements, participant movement, etc.), metadata (e.g., polling events, chat messages, attendees joining/leaving, identification of who is talking, presenter changes, configuration changes, questions from attendees, etc.), combinations of various audio/video/metadata content, and so on.

During such operation, the analyzer circuitry 114 provides range identifiers 150 that correlate to particular classification criteria. In some arrangements that classify based on a combination of criteria, the analyzer circuitry 114 generates individual criteria sub-scores or weights for each portion of the initial recording 22 and then adds the sub-scores/weights together to determine whether that portion is relevant or irrelevant. Further details will now be provided with reference to FIG. 4.

Figure 4:
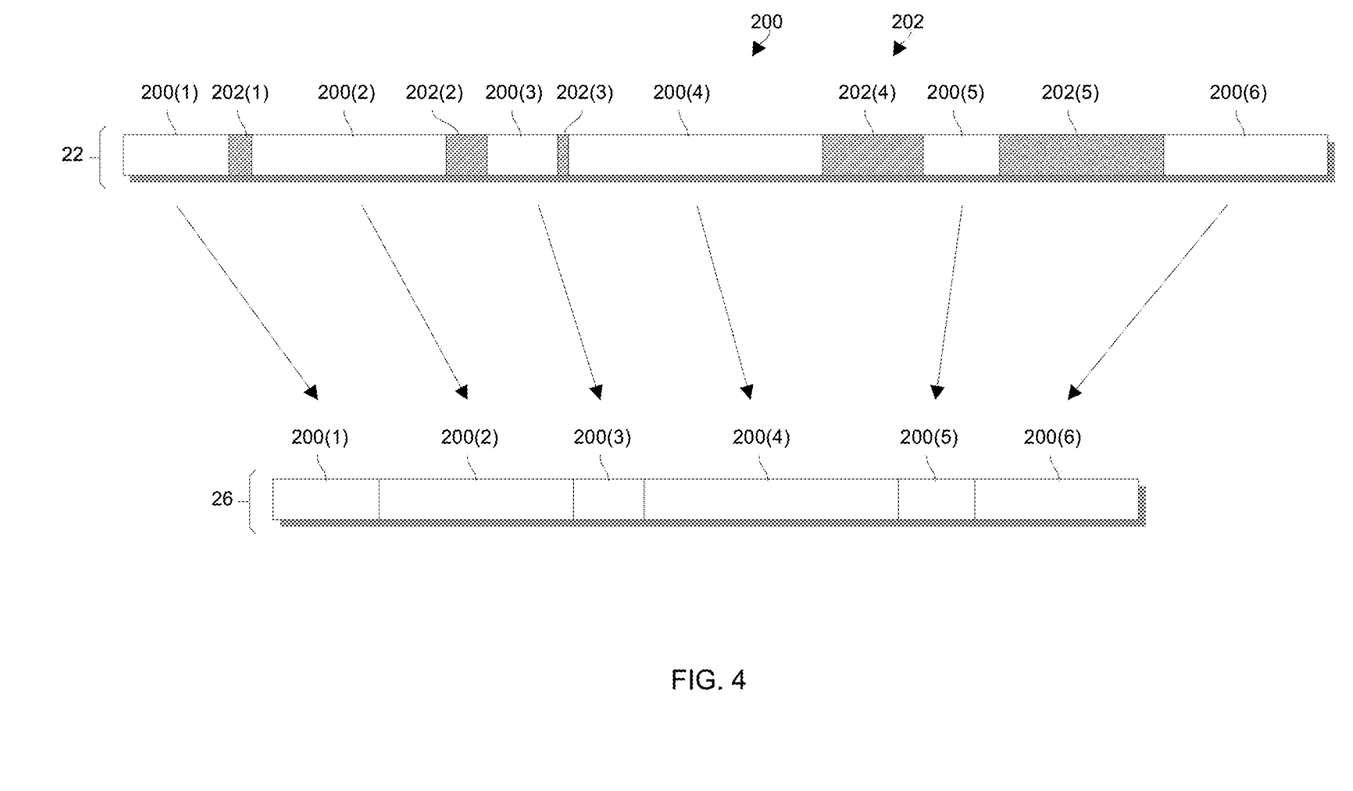
FIG. 4 is a block diagram of an example shortened recording.

FIG. 4 shows how an example shortened recording 26 relates to an initial recording 22. In particular, the initial recording 22 includes relevant portions 200(1), 200(2), 200(3), 200(4), 200(5), 200(6) (illustrated as white boxes) and irrelevant portions 202(1), 202(2), 202(3), 202(4), 202 (5) (illustrated as shaded boxes). The relevant portions 200(1), 200(2), 200(3), 200(4), 200(5), 200(6) are considered to include content that is of interest to users (e.g., that contains voice, that includes certain video movement of significance, that includes participation of certain attendees, etc.). On the other hand, irrelevant portions 202(1), 202(2), 202(3), 202(4), 202(5), are considered to include content that is not of interest to users (e.g., that contains no voice, that includes thinking noises, that includes no movement of significance, where attendees are joining or leaving, etc.).

In contrast, the shortened recording 26 which is provided by the circuitry 100 (FIG. 3) includes the relevant portions 200(1), 200(2), 200(3), 200(4), 200(5), 200(6) and omits the irrelevant portions 202(1), 202(2), 202(3), 202(4), 202(5). Accordingly, the play duration of the shortened recording 26 is less than that of the initial recording 22. As a result, a user is able to listen and watch the shortened recording 26 in less time and does not need to manually navigate to skip over the irrelevant portions 202(1), 202(2), 202(3), 202(4), 202(5).

It should be understood that the range identifiers 150 (FIG. 3) that identify the relevant portions 200 and irrelevant portions 202 may define the beginning time and end time of each portion. Further details will now be provided with reference to FIG. 5.

Figure 5:
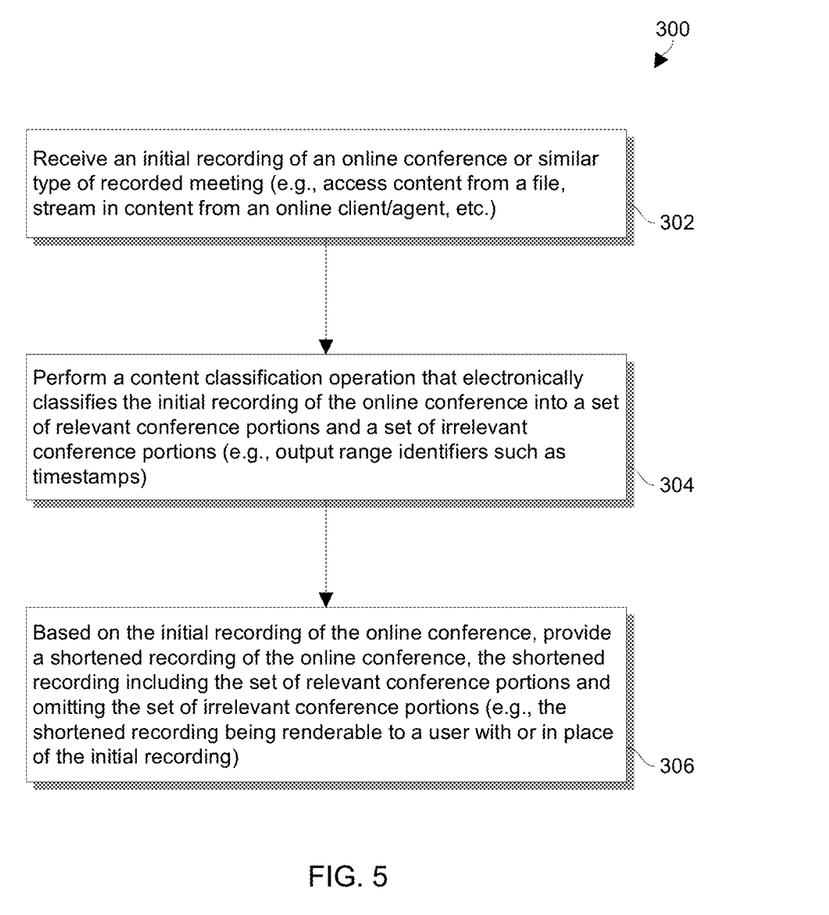
FIG. 5 is a flowchart of a procedure that is performed by the electronic apparatus of FIG. 2.

FIG. 5 is a flowchart of a procedure 300 that is performed by the electronic apparatus 60 of FIG. 2 (also see the circuitry 100 of FIG. 3). In particular, the electronic apparatus 60 creates a shortened recording (or digest) 26 of an online conference 24 from an initial recording 22 of the online conference 24.

At 302, the electronic apparatus 60 receives the initial recording 22 of the online conference 24. It should be understood that the initial recording 22 may have been generated locally by a client (e.g., see the online conference client apparatus 32 in FIG. 1). Alternatively, the initial recording 22 may have been generated by a central online meeting engine (e.g., see the online conference server apparatus 34 in FIG. 1).

At 304, the electronic apparatus 60 performs a content classification operation that electronically classifies the initial recording of the online conference into a set of relevant conference portions and a set of irrelevant conference portions. In particular, the circuitry 100 inputs the initial recording 22 of the online conference 24 into a detection engine that assesses content relevancy. Next, the circuitry 100 obtains, as output from the detection engine, a series of range identifiers that identifies the set of relevant conference portions and the set of irrelevant conference portions of the initial recording 22.

At 306, the electronic apparatus 60 provides, based on the initial recording 22 of the online conference 24, a shortened recording 26 of the online conference 24. The shortened recording 26 includes the set of relevant conference portions and omitting the set of irrelevant conference portions. Here, the shortened recording 26 includes playable content based on (i) the initial recording of the online conference and (ii) the series of range identifiers (e.g., timestamps), the playable content skipping over the set of irrelevant conference portions. The circuitry 100 writes the playable content to a playable file that is shorter in playing duration than the multimedia file from the online meeting engine, the playable file including abridged audio content and abridged video content based on the recorded audio content and recorded video content of the multimedia file.

With the shortened recording 26 now available, a user is able to watch the shortened recording 26 to focus time and attention on the significant portions of the recorded online conference. In some arrangements, the user is able to concurrently access both the multimedia file and the playable file via a media player to enable a user to selectively play or skip over each of the irrelevant conference portions in real time. In some arrangements, the user is able to play the shortened recording 26 in an almost real-time manner where the initial recorded is inputted into the circuitry 100 (FIG. 3) for processing into the shortened recording 26 as soon as it is recorded.

As described above, improved techniques are directed to providing shortened recordings 26 of online conferences 24. In particular, an initial recording 22 of an online conference 24 is classified into relevant portions 200 and irrelevant portions 202 in an automated manner. Then, a shortened recording 26 is provided based on the initial recording 22 where the shortened recording 26 includes the relevant portions 200 but omits the irrelevant portions 202. A user that watches the shortened recording 26 saves time and enjoys an improved user experience as the user only consumes the relevant portions 200 of the initial recording 22.

Additionally, it should be understood that the above-described techniques were mainly described in the context of captured online conferences. However, it should be understood that such techniques are well-suited for various other types of recordings such as recorded meetings. Along these lines, the techniques are applicable to recorded lectures in a university, recorded conferences in general (e.g., not necessarily just online conferences), and even meetings (online or offline) that are recorded for subsequent access, as well as others.

Furthermore, one should appreciate that this above-described techniques amount to more than simply providing a shortened recording 26 from an initial recording 22. Rather, the techniques involves detecting relevant portions 200 and irrelevant portions 202 of content in a recorded online conference 26, and then creating a shortened recording 26 that includes only the relevant portions 200. Thus, a user may save time and effort watching only the relevant portions 200 without having to manually skip ahead or play the initial recording 22 faster.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the computerized online conference setting 20 (FIG. 1) are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, cellular-based communications, combinations thereof, and so on.

Additionally, with a recording digest, it should be understood that it is possible to reduce the length of media files that represent recorded online sessions or similar content (e.g. recorded lectures) by removing irrelevant parts from the recording. Users that watch these recordings save time as they only need to consume the relevant parts.

Recordings of online webinars, online training, online meetings, lectures, or presentations become increasingly relevant. Some of these events are held by professional speakers, some are held by average speakers. In recordings of sessions with average speakers, many parts are irrelevant or contain no information at all (e g thinking noises, see below). The viewer of these recordings has currently no choice but to watch all of the session so as not to miss important information. Even with professional speakers a user may wish to skip parts that are unimportant to understand the whole idea/concept of what was presented.

The recording digest equipment disclosed herein analyzes media files of recorded online sessions, school lectures, or presentations to find parts that contain no information.

Having finished the analysis, the recording digest equipment creates another media file containing the relevant parts of the original media file.

It should be understood that analyzing and skipping are separate steps, so that the user is able to inspect the cuts before actually losing data. The skipping step can also be implemented in a custom-built media player that in addition to the original media file consumes the position data created by the analyzing step.

A short description of some suitable classification criteria for identifying relevant and irrelevant parts of a recording will now be provided. It should be understood that other classification criteria are suitable as well and that these are provided by way of example only.

First, relevance can be based on voice detection. That is, one way to detect relevance in recordings is to find voice in the recorded audio track. Each part of the recording that contains voice can be considered relevant. If sections between parts that contain voice are very short then they are also considered as relevant.

Additionally, relevance can be based on thinking noise detection. Common thinking noises are "um's" and "uh's". Other example thinking noises are words/phrases such as: "okay", "basically", "and", "right", "that", "then", "you know", "so", "anyways", "hmmm", "huh", "well", "you know", "really", "like", and many, many others. Once these words or noises are detected within the right scope, the containing part in the video file is considered irrelevant.

Furthermore, relevance can be based on transcription. That is, the transliterated audio track can be searched for relevance or irrelevance. The dialog of the attendees can be classified using the words found in the transcription. Example classifications include:

Solving technical issues of the online session
    Audio issues ("Can you hear me?")
    Screen sharing issues ("Can you see my screen?")
    Connection issues ("Hello? Anybody there?")
Solving issues with the presentation
    Slides were accidentally skipped
    Slides disappear or are out of order
Q & A sessions
    Presenter repeats the question that had been asked by the audience (e.g. skip original question as this is usually difficult to understand in average recordings)

Transcription may not necessarily provide 100% reliability. However, what was not transliterated can be considered relevant/irrelevant and can be left in or removed by a voice detection module if necessary.

If transcription is fully reliable/accurate, it can be used to remove thinking noises as well, thereby replacing voice detection entirely. In that case everything that was not covered by the transcription would be considered irrelevant.

Furthermore, relevance can be based on screen content detection. That is, if a session is presented using slides, then slide changes also indicate an important part of the session. Also, section of the recording may be considered relevant if the whole screen changed its content during that time. Moreover, mouse movement (e.g., position, speed, frequency, clicks, etc.) also contributes to relevance detection.

Additionally, relevance can be based on webcam feeds. Here, webcam feeds are analyzed to consider motion of attendees as relevant or irrelevant. Also, the recorded video content can be analyzed for head and mouth movement (e.g. active speaker detection, lip-reading)

Additionally, relevance can be based on webcam feeds. That is, the following metadata helps to distinguish between relevant and irrelevant parts of a recording:

Polls
Chat messages
Attendees joining or leaving the session
Active speaker information
Screen presenter changing
People turning their webcam on and off
Questions from attendees Furthermore, it should be understood that the results of the analyzing pass are the parts that are considered irrelevant, i.e., "slice ranges" (e.g., see FIG. 4). These slice ranges are simply ranges of content defined by time intervals with a starting and ending time from within the multimedia file which the analyzer classified as relevant or irrelevant.

The skipping pass (e.g., see the first pass 130 in FIG. 3) reads the input video file again (green container of the left) decodes the data, and cuts out media data that belongs to the slice ranges. The next pass (e.g., see the second pass 132 in FIG. 3) can be implemented as a part or an extension of a media player. For that, an AAC Encoder, H.264 Encoder, MP4 Writer, and the resulting MP4 file can be replaced by an audio and a video renderer/display component. If the user of the media player wishes to consume the original media, the slicer and accelerator components are turned off.

It should be understood that the recording digest can be considered as a filter that transforms one input video file into one output video file.

One should appreciate that the functionality of the electronic apparatus 60 (FIG. 2) can be provided in the following contexts:

A tool that converts/shortens media files.
An online service that provides the digest automatically or on demand (i.e. after uploading a media file or after finishing an online session recording)
An online service that receives a URL to recorded content and provides the processed version
A media player can skip irrelevant parts of the video on the fly, given that it has the skipping pass implemented. This enables users to control whether they like to see the original video file or the processed video file. Also, playback speed changes can be applied on demand without changing the pitch of the audio track.
A Recording Manager of an online conference client can implement the recording digest to reduce the recording duration.
Cloud-based Recording can automatically create a shortened version of the recording in addition to the original or simply provide the analysis result to an online video player.
An API/SDK that can be used by other content providers Such modifications and enhancements are intended to belong to various embodiments of the disclosure.

What is claimed is:

1. A computer-implemented method of processing an initial recording of an online conference, the method comprising:
receiving the initial recording of the online conference, the initial recording of the online conference including recorded audio content, recorded video content, and metadata;
performing a content classification operation that electronically classifies the initial recording of the online conference into a set of relevant conference portions and a set of irrelevant conference portions; and
based on the initial recording of the online conference, providing a shortened recording of the online conference, the shortened recording including the set of relevant conference portions and omitting the set of irrelevant conference portions,
wherein performing the content classification operation includes (i) inputting the initial recording of the online conference into a detection engine, the detection engine evaluating the recorded audio content, the recorded video content, and the metadata included in the initial recording of the online conference to assess content relevancy, and (ii) obtaining, as output from the detection engine, a series of range identifiers that identifies, according to one or more of the evaluated audio content, the evaluated video content, and the evaluated metadata, the set of relevant conference portions and the set of irrelevant conference portions of the initial recording of the online conference, and
wherein evaluating the recorded audio content, the recorded video content, and the metadata included in the initial recording of the online conference includes:
in a first pass, (i) extracting the recorded audio content, the recorded video content, and the metadata from the initial recording of the online conference, (ii) decoding the extracted audio content, the extracted video content, and the extracted metadata, and (iii) classifying the decoded audio content, the decoded video content, and the decoded metadata into the set of relevant conference portions and the set of irrelevant conference portions, the set of relevant conference portions including relevant audio content, relevant video content, and relevant metadata from the initial recording of online conference, and the set of irrelevant conference portions including irrelevant audio content, irrelevant video content, and irrelevant metadata from the initial recording of online conference;
in a second pass, (i) extracting the recorded audio content, the recorded video content, and the metadata from the initial recording of the online conference, (ii) decoding the extracted audio content, the extracted video content, and the extracted metadata, (iii) generating a shortened audio stream from the decoded audio content, the shortened audio stream including the decoded audio content that corresponds to the relevant audio content and omitting the decoded audio content that corresponds to the irrelevant audio content, (iv) generating a shortened video stream from the decoded video content, the shortened video stream including the decoded video content that corresponds to the relevant video content and omitting the decoded video content that corresponds to the irrelevant video content, (v) encoding the shortened audio stream and the shortened video stream to generate abridged audio content and abridged video content, respectively, (vi) encoding the decoded metadata that corresponds to the relevant metadata for the abridged audio content and the abridged video content, and (vii) generating the shortened recording of the online conference from the abridged audio content, the abridged video content, and the encoded metadata; and
prompting a user between the first pass and the second pass to enable the user to inspect one or more of the omitted audio content and the omitted video content to avoid losing relevant content.

2. A computer-implemented method as in claim 1 wherein providing the shortened recording of the online conference includes:

outputting, as the shortened recording, playable content based on (i) the initial recording of the online conference and (ii) the series of range identifiers, the playable content skipping over the set of irrelevant conference portions.

3. A computer-implemented method as in claim 2 wherein receiving the initial recording of the online conference includes:
  acquiring a multimedia file from an online conference engine, the multimedia file including additional recorded audio content and additional recorded video content that are contributed by a set of participants of the online conference.

4. A computer-implemented method as in claim 3 wherein performing the content classification operation further includes:
  generating at least some of the series of range identifiers according to the additional recorded audio content of the multimedia file.

5. A computer-implemented method as in claim 4 wherein generating at least some of the series of range identifiers includes:
  detecting voice passages in the additional recorded audio content of the multimedia file, and
  providing, as at least some of the series of range identifiers, timestamps that correlate to when the voice passages are absent for a predefined amount of time in the additional recorded audio content.

6. A computer-implemented method as in claim 4 wherein generating at least some of the series of range identifiers includes:
  detecting thinking noises in the additional recorded audio content of the multimedia file, and
  providing, as at least some of the series of range identifiers, timestamps that correlate to when the thinking noises are present in the additional recorded audio content.

7. A computer-implemented method as in claim 4 wherein generating at least some of the series of range identifiers includes:
  performing a speech recognition operation on the additional recorded audio content of the multimedia file to obtain a transcription of the additional recorded audio content, and
  providing, as at least some of the series of range identifiers, timestamps that correlate to when the phrases occur in the transcription.

8. A computer-implemented method as in claim 3 wherein performing the content classification operation further includes:
  generating at least some of the series of range identifiers according to the additional recorded video content of the multimedia file.

9. A computer-implemented method as in claim 8 wherein generating at least some of the series of range identifiers includes:
  detecting slide changes in the additional recorded video content of the multimedia file, and
  providing, as at least some of the series of range identifiers, timestamps that correlate to the slide changes in the additional recorded video content.

10. A computer-implemented method as in claim 8 wherein generating at least some of the series of range identifiers includes:
  detecting participant motion in the additional recorded video content of the multimedia file, and
  providing, as at least some of the series of range identifiers, timestamps that correlate to participant motion in the additional recorded video content.

11. A computer-implemented method as in claim 3 wherein performing the content classification operation further includes:
  from the multimedia file, reading online conference metadata saved during the online conference,
  generating at least some of the series of range identifiers according to the online conference metadata saved during the online conference.

12. A computer-implemented method as in claim 11 wherein generating at least some of the series of range identifiers includes:
  based on the metadata saved during the online conference, detecting changes in participant attendance during the online conference, and
  providing, as at least some of the series of range identifiers, timestamps that correlate to the changes in participant attendance during the online conference.

13. A computer-implemented method as in claim 11 wherein generating at least some of the series of range identifiers includes:
  based on the metadata saved during the online conference, detecting changes in participant interaction format during the online conference, and
  providing, as at least some of the series of range identifiers, timestamps that correlate to the changes in participant interaction format during the online conference.

14. A computer-implemented method as in claim 3 wherein outputting the playable content includes:
  writing the playable content to a playable file that is shorter in playing duration than the multimedia file from the online conference engine, the playable file including abridged audio content and abridged video content based on the additional recorded audio content and the additional recorded video content of the multimedia file.

15. A computer-implemented method as in claim 14, further comprising:
  concurrently accessing the multimedia file and the playable file via a media player to enable the user to selectively play or skip over each of the irrelevant conference portions in real time.

16. A computer-implemented method as in claim 2 wherein receiving the initial recording of the online conference includes:
  during the online conference, acquiring streaming audio content and streaming video content recorded by an online conference engine participating in the online conference.

17. A computer-implemented method as in claim 16 wherein providing the shortened recording of the online conference includes:
  writing the playable content to a playable file that is shorter in playing duration than the initial recording of the online conference, the playable file including abridged audio content and abridged video content based on the streaming audio content and the streaming video content recorded by the online conference engine.

18. A computer-implemented method as in claim 2, wherein obtaining the series of range identifiers includes:
  detecting speech passages in the recorded audio content, the speech passages corresponding to instances of uninterrupted speech; and providing, as at least some of the series of range identifiers, timestamps that correlate to when the speech passages are absent for a predefined amount of time in the recorded audio content, and wherein providing the shortened recording of the online conference includes outputting, as the shortened recording, the playable content based on (i) the initial recording of the online conference and (ii) the series of range identifiers, the playable content skipping over the set of irrelevant conference portions.

19. A computer-implemented method as in claim 2, wherein the recorded video content includes images of slides belonging to an electronic presentation, and wherein obtaining the series of range identifiers includes (i) detecting slide changes in the recorded video content, and (ii) providing, as at least some of the series of range identifiers, timestamps that correlate to the slide changes in the recorded video content.

20. A computer-implemented method as in claim 1 wherein an original video stream for the initial recording of the online conference has an associated first frame rate, and wherein the second pass includes:

performing a frame rate conversion on the shortened video stream from the first frame rate to a second frame rate to provide an improved viewing experience for a viewer of the shortened recording of the online conference, the second frame rate being different from the first frame rate.

21. A computer program product having a non-transitory computer readable medium that stores a set of instructions to process an initial recording of an online conference, the set of instructions, when carried out by computerized circuitry, causing the computerized circuitry to perform a method of:

receiving the initial recording of the online conference, the initial recording of the online conference including recorded audio content, recorded video content, and metadata;

performing a content classification operation that electronically classifies the initial recording of the online conference into a set of relevant conference portions and a set of irrelevant conference portions; and based on the initial recording of the online conference, providing a shortened recording of the online conference, the shortened recording including the set of relevant conference portions and omitting the set of irrelevant conference portions, wherein performing the content classification operation includes (i) inputting the initial recording of the online conference into a detection engine, the detection engine evaluating the recorded audio content, the recorded video content, and the metadata included in the initial recording of the online conference to assess content relevancy, and (ii) obtaining, as output from the detection engine, a series of range identifiers that identifies, according to one or more of the evaluated audio content, the evaluated video content, and the evaluated metadata, the set of relevant conference portions and the set of irrelevant conference portions of the initial recording of the online conference, and wherein evaluating the recorded audio content, the recorded video content, and the metadata included in the initial recording of the online conference includes:

in a first pass, (i) extracting the recorded audio content, the recorded video content, and the metadata from the initial recording of the online conference, (ii) decoding the extracted audio content, the extracted video content, and the extracted metadata, and (iii) classifying the decoded audio content, the decoded video content, and the decoded metadata into the set of relevant conference portions and the set of irrelevant conference portions, the set of relevant conference portions including relevant audio content, relevant video content, and relevant metadata from the initial recording of online conference, and the set of irrelevant conference portions including irrelevant audio content, irrelevant video content, and irrelevant metadata from the initial recording of online conference;

in a second pass, (i) extracting the recorded audio content, the recorded video content, and the metadata from the initial recording of the online conference, (ii) decoding the extracted audio content, the extracted video content, and the extracted metadata, (iii) generating a shortened audio stream from the decoded audio content, the shortened audio stream including the decoded audio content that corresponds to the relevant audio content and omitting the decoded audio content that corresponds to the irrelevant audio content, (iv) generating a shortened video stream from the decoded video content, the shortened video stream including the decoded video content that corresponds to the relevant video content and omitting the decoded video content that corresponds to the irrelevant video content, (v) encoding the shortened audio stream and the shortened video stream to generate abridged audio content and abridged video content, respectively, (vi) encoding the decoded metadata that corresponds to the relevant metadata for the abridged audio content and the abridged video content, and (vii) generating the shortened recording of the online conference from the abridged audio content, the abridged video content, and the encoded metadata; and prompting a user between the first pass and the second pass to enable the user to inspect one or more of the omitted audio content and the omitted video content to avoid losing relevant content.

22. An electronic apparatus, comprising:

an interface;

memory; and control circuitry coupled to the interface and the memory, the memory storing instructions that, when carried out by the control circuitry, cause the control circuitry to:

receive the initial recording of an online conference, the initial recording of the online conference including recorded audio content, recorded video content, and metadata, perform a content classification operation that electronically classifies the initial recording of the online conference into a set of relevant conference portions and a set of irrelevant conference portions; and based on the initial recording of the online conference, provide a shortened recording of the online conference, the shortened recording being accessible via the interface, and the shortened recording including the set of relevant conference portions and omitting the set of irrelevant conference portions, wherein performing the content classification operation includes (i) inputting the initial recording of the online conference into a detection engine, the detection engine evaluating the recorded audio content, the recorded video content, and the metadata included in the initial recording of the online conference to assess content relevancy, and (ii) obtaining, as output from the detection engine, a series of range identifiers that identifies, according to one or more of the evaluated audio content, the evaluated video content, and the evaluated metadata, the set of relevant conference portions and the set of irrelevant conference portions of the initial recording of the online conference, and wherein evaluating the recorded audio content, the recorded video content, and the metadata included in the initial recording of the online conference includes:

in a first pass, (i) extracting the recorded audio content, the recorded video content, and the metadata from the initial recording of the online conference, (ii) decoding the extracted audio content, the extracted video content, and the extracted metadata, and (iii) classifying the decoded audio content, the decoded video content, and the decoded metadata into the set of relevant conference portions and the set of irrelevant conference portions, the set of relevant conference portions including relevant audio content, relevant video content, and relevant metadata from the initial recording of online conference, and the set of irrelevant conference portions including irrelevant audio content, irrelevant video content, and irrelevant metadata from the initial recording of online conference;

in a second pass, (i) extracting the recorded audio content, the recorded video content, and the metadata from the initial recording of the online conference, (ii) decoding the extracted audio content, the extracted video content, and the extracted metadata, (iii) generating a shortened audio stream from the decoded audio content, the shortened audio stream including the decoded audio content that corresponds to the relevant audio content and omitting the decoded audio content that corresponds to the irrelevant audio content, (iv) generating a shortened video stream from the decoded video content, the shortened video stream including the decoded video content that corresponds to the relevant video content and omitting the decoded video content that corresponds to the irrelevant video content, (v) encoding the shortened audio stream and the shortened video stream to generate abridged audio content and abridged video content, respectively, (vi) encoding the decoded metadata that corresponds to the relevant metadata for the abridged audio content and the abridged video content, and (vii) generating the shortened recording of the online conference from the abridged audio content, the abridged video content, and the encoded metadata;

prompting a user between the first pass and the second pass to enable the user to inspect one or more of the omitted audio content and the omitted video content to avoid losing relevant content.

* * * * *